(No Model.) 2 Sheets—Sheet 1.

W. R. VAN VLIET.
CONVERTIBLE MOWER AND INSECT CATCHER.

No. 359,191. Patented Mar. 8, 1887.

WITNESSES
F. L. Ourand
Edward Stanton

Warren R. Van Vliet,
INVENTOR
By Louis Bagger & Co.
Attorneys.

N. PETERS, Photo-Lithographer, Washington, D. C.

(No Model.) 2 Sheets—Sheet 2.
W. R. VAN VLIET.
CONVERTIBLE MOWER AND INSECT CATCHER.
No. 359,191. Patented Mar. 8, 1887.
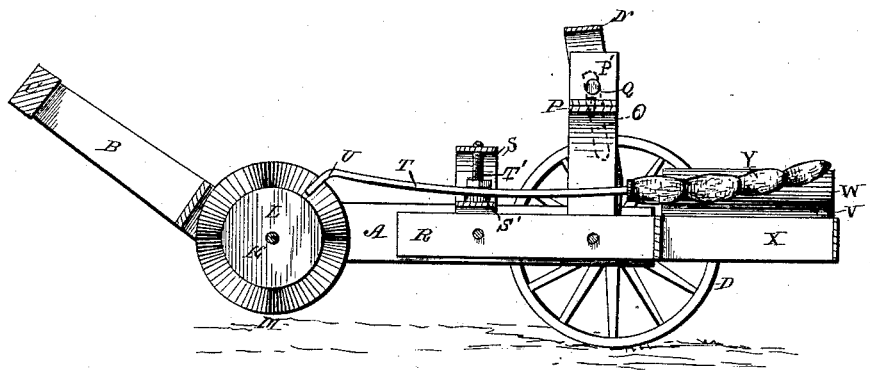
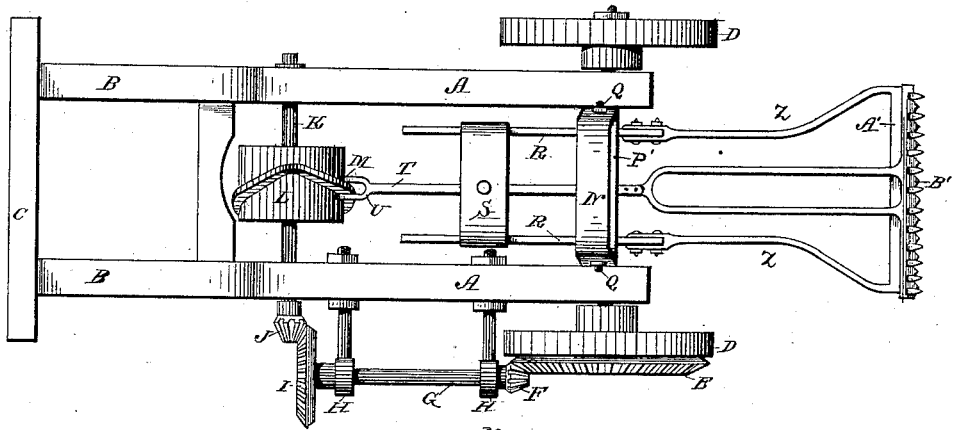
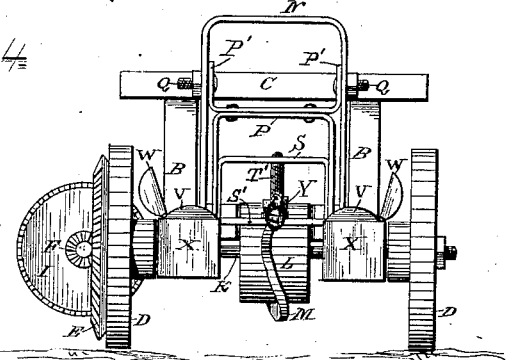
WITNESSES
F. L. Ourand
Edward Stanton
INVENTOR
Warren R. Van Vliet
By Louis Bagger & Co.
Attorneys

UNITED STATES PATENT OFFICE.

WARREN R. VAN VLIET, OF EAST STROUDSBURG, PENNSYLVANIA.

CONVERTIBLE MOWER AND INSECT-CATCHER.

SPECIFICATION forming part of Letters Patent No. 359,191, dated March 8, 1887.

Application filed April 26, 1886. Serial No. 200,181. (No model.)

*To all whom it may concern:*

Be it known that I, WARREN R. VAN VLIET, a citizen of the United States, and a resident of East Stroudsburg, in the county of Monroe and State of Pennsylvania, have invented certain new and useful Improvements in a Convertible Mower and Insect-Catcher; and I do hereby declare that the following is a full, clear, and exact description of the invention, which will enable others skilled in the art to which it appertains to make and use the same, reference being had to the accompanying drawings, which form a part of this specification, and in which—

Figure 1:
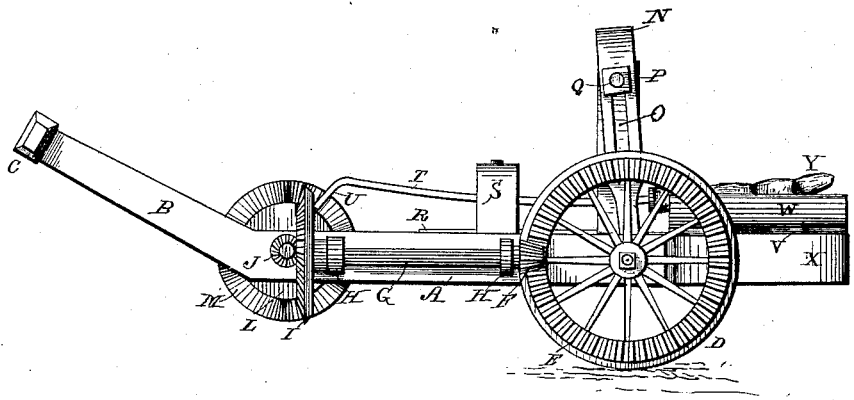
Figure 2:
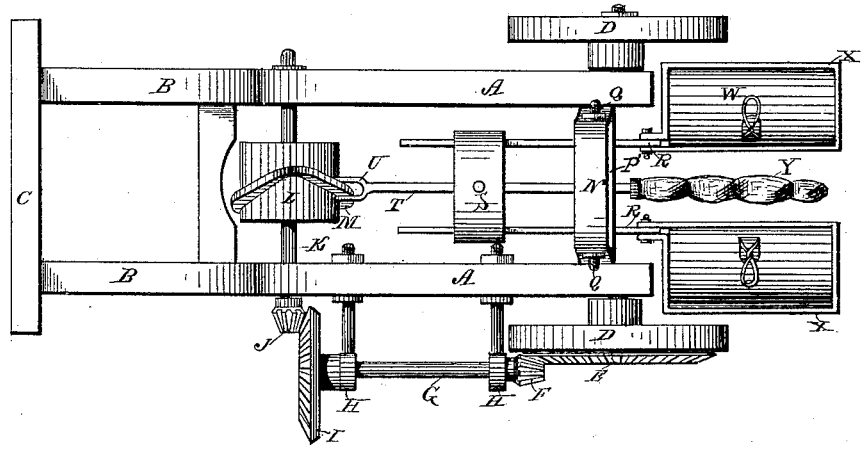

Figure 1 is a side view of my improved convertible machine, showing it adapted to catch insects. Fig. 2 is a top view of the same. Fig. 3 is a longitudinal vertical sectional view of the machine. Fig. 4 is a front view, and Fig. 5 is a top view, of the machine used as a lawn-mower.

Similar letters of reference indicate corresponding parts in all the figures.

My invention has relation to convertible insect-catchers and lawn-mowers; and it consists in the improved construction and combination of parts of a machine which may be propelled straddling a row of plants, and in which a lever having its end wrapped with textile material for the purpose of softening it will knock the insects from off the plants and into boxes or receptacles, and which machine may be converted, upon removing the receptacles and the knocking end of the lever, into a lawn-mower by securing two arms in the frame having a finger-bar between their diverging forward ends, and by securing a cutter-bar to the end of the lever, as hereinafter more fully described and claimed.

In the accompanying drawings, the letters A A indicate the side pieces of the frame, the rear ends of which side pieces are turned up to form handles B B, connected at the upper ends by a cross-piece, C.

Two wheels, D D, are journaled upon stub-axles at the forward ends of the side pieces, and one of these wheels is provided with a beveled cogged rim, E, with which a conical pinion, F, at the forward end of a shaft, G, journaled in laterally-projecting brackets H H upon the side piece of the frame, meshes.

The rear end of the shaft is provided with a bevel cog-wheel, I, which meshes with a pinion, J, upon the end of a transverse shaft, K, journaled in bearings in the side pieces, and the middle of this shaft has a cam-disk, L, formed with a waved flange or rib, M, upon its periphery.

The side pieces are connected near their forward ends by the arched cross-piece N, whose upright portions are provided with longitudinal slots O. A similarly-constructed frame, P, to whose upper portion is riveted a a U-shaped piece, P', is secured within said frame N by means of the clamping-bolts Q, which pass through the ends of the piece P' and the slot O in the frame N.

To the lower end of the frame P are rigidly secured two bars, R, which extend in a horizontal manner to the front and rear of said frame, the rear ends being attached to the lower end of an arched frame, S, which has a cross-piece, S', joining its upright portions. Upon the center of this cross-piece rests a lever, T, which is pivoted there upon the screw T'.

The rear end of the lever is bifurcated and bent downward, as shown at U, and engages the waved flange, so that when the disk having the waved flange is revolved the lever will be rocked.

Two cylindrical casings, V V, having hinged lids W, are placed within rectangular frames X upon the outer ends of the bars, and the forward end of the lever is provided with a knocker, Y, having a covering of textile material upon it, and the covers of the casings are opened to the sides, leaving them open, and the knocker may now, when it is propelled straddling a row of plants, knock the insects from the plants into the casings without injuring the plants, the arched frame P and its bars and lever being lowered or raised according to the height of the plants.

When the machine is to be converted into a lawn-mower, the insect boxes or casings and the knocker are removed and a pair of diverging arms, Z Z, are secured to the forward ends of the bars R, the said arms Z Z having a finger-bar, A', secured between their outer ends.

A reciprocating cutter-bar, B', slides in suitable bearings upon the finger-bar, and is provided with rearwardly-extending arms, which are secured to the forward end of the lever T. It will thus be seen that when the machine is propelled the cutting-bar will be reciprocated, and that the stationary finger-bar may be raised or lowered, as desired, by raising or lowering the arched frame P, which carries the bars R, according to the manner of cut desired to be attained with the machine.

Having thus described my invention, I claim and desire to secure by Letters Patent of the United States—

1. The combination of a wheeled frame, longitudinally-slotted uprights at the front end of the side pieces of said frame, an adjustable frame provided with bolts passing through its side pieces and the slots in the uprights, horizontal bars secured to the lower end of the adjustable frame, their front ends being adapted for attachment thereto of a grass-cutting apparatus, or of frames carrying boxes for the purpose set forth, cross-pieces connecting the rear ends of said horizontal bars, a lever pivoted to said cross-pieces, its rear end being bifurcated and its forward end being adapted for attachment to the cutting-bar of said grass-cutting apparatus, or to a knocker, for the purpose described, a cam-disk formed with a waved flange adapted to coact with the bifurcated end of said lever, and a train of gear, substantially as described, for rotating said disk, for the purpose set forth.

2. The combination of longitudinal side pieces having their rear ends bent upward and connected with a cross-piece to form a handle, drive-wheels journaled upon stub-axles at the forward ends of the side pieces, a bevel-gear upon one wheel, a longitudinal shaft having a pinion at its forward end meshing with the bevel-gear, and having a bevel cog-wheel at its rear end, a transverse shaft near the rear ends of the side pieces, having a disk provided with a waved flange, and having a bevel-pinion meshing with the bevel cog-wheel, vertically-slotted uprights at the forward ends of the side pieces, an adjustable frame having bolts at its upper ends sliding adjustably in the slotted uprights, and having horizontal bars at its lower ends, cross-pieces secured to the rear ends of said bars, while the forward ends thereof are adapted for attachment thereto of a grain-cutting apparatus, or rectangular frames in which fit casings provided with lids at their upper sides, and a lever pivoted to said cross-pieces and provided with a bifurcated rear end adapted to engage the waved flange upon said disk, the forward end of said lever being adapted for attachment thereto of the cutting-bar of said grain-cutting apparatus, or a knocker wrapped with a textile fabric at its forward end, as and for the purpose set forth.

In testimony that I claim the foregoing as my own I have hereunto affixed my signature in presence of two witnesses.

WARREN R. VAN VLIET.

Witnesses:
A. B. SHAFER,
S. S. SHAFER.